United States Patent Office 2,802,813
Patented Aug. 13, 1957

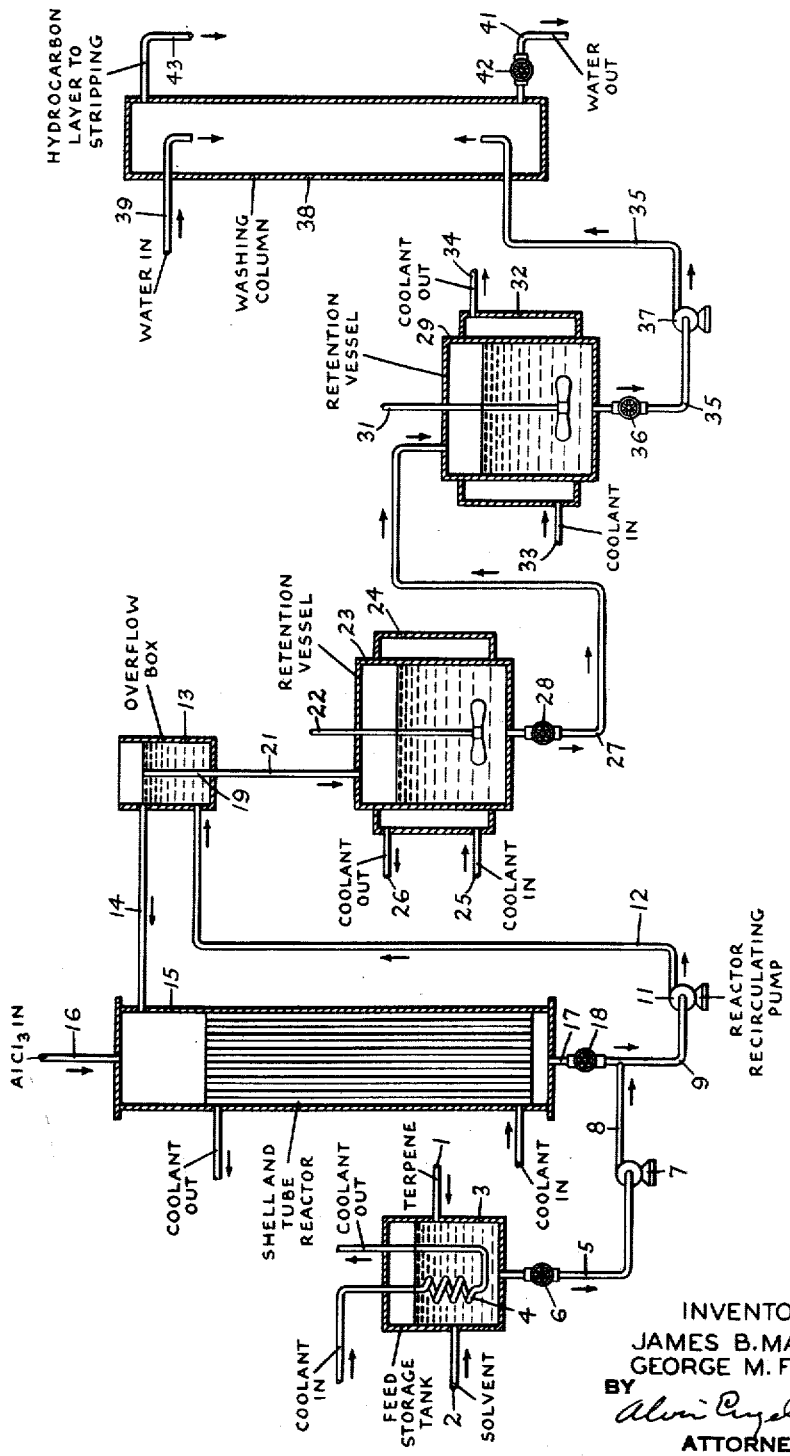

2,802,813

TERPENE RESIN

James B. Maguire, Elkins Park, and George M. Fohlen, Philadelphia, Pa., assignors to Allied Chemical & Dye Corporation, New York, N. Y., a corporation of New York Application January 6, 1954, Serial No. 402,546

5 Claims. (Cl. 260—93.3)

This invention relates to the production of terpene resins and more particularly refers to a new and improved method of converting pinenes into essentially pure thermoplastic polymers of high melting point, low specific gravity and light color.

Terpene resins have found wide application for use in adhesives, rubber compounds, coatings, inks, and as waterproofing and stiffening for paper or textiles. The primary source of raw material for manufacturing terpene resins is turpentine or fractions thereof which contain terpenes and which when polymerized in the presence of a Friedel-Crafts catalyst, particularly aluminum chloride or boron trifluoride and their complexes, result in a mixture of polymers ranging from dimers to hard resins. Past experience has shown that the polymerization of turpentine proceeds with ease to produce oily polymer products such as dimers and trimers but that difficulties were encountered in producing high yields of good quality hard resins having a melting point, R. & B., above 100° C. Investigation of the terpene composition of turpentine shows it to contain predominantly alpha pinene, about 60–70%, with an appreciably lesser amount of beta pinene, about 15–30%, and with a much smaller amount of other terpenes, about 1–10%. Further study of the alpha and beta pinenes disclosed that beta pinene could readily be polymerized under conventional operating conditions to produce satisfactory hard resin of melting point higher than 100° C. but alpha pinene polymerized to produce predominantly oily polymer product with very low yields, about 20–40%, of hard, non-uniform resins having a melting point above 100° C. Turpentine which as previously mentioned contains approximately two-thirds alpha pinene is dominated by its high content of alpha pinene and behaves as expected in a manner similar to alpha pinene when subjected to polymerization. Because of the low yields of hard resin from turpentine and the difficulties in such operation, industry found it inexpedient to produce hard resins from turpentine and resorted to employing pure beta pinene or fractions predominating in beta pinene as the source of raw material to be polymerized. Of course this required the expensive procedure of separating beta pinene from turpentine and the loss of the much more prevalent alpha pinene as a raw material for producing the hard resin. Some suggestions have been made to subject alpha pinene to drastic polymerizing conditions for extended periods of time in the presence of special and large amount of catalyst but to the best of our knowledge none of these methods have found commercial favor because of high cost of operation, poor quality product or low yields.

An object of the present invention is to provide an efficient method for converting turpentine or fractions thereof into high yields of thermoplastic resins having a melting point in excess of 100° C.

Another object is to provide a continuous process maintained under regulated reaction conditions for converting terpenes into high yields of polymer product.

A further object of this invention is to provide an economical method of polymerizing alpha pinene or mixtures containing predominantly alpha pinene into high yields of thermoplastic resin having a melting point above 100° C.

Other objects and advantages will be apparent from the following description and accompanying drawing.

The conventional method for polymerizing turpentine is to place a batch of turpentine in a kettle equipped with a jacket to provide indirect cooling of the liquid contents. Polymerizing catalyst is added to the liquid turpentine, the contents agitated and cooled, and maintained therein for extended periods of time, a matter of 6–12 hours or more, until substantially no further reaction occurs. Because of the refractory nature of alpha pinene in the turpentine and localized hot spots despite the agitation and cooling, the hard resin product produced under these conditions is not uniform in quality and low in yield. Consequently the art turned to the use of beta pinene because it produced higher yields of hard resin despite the fact that it is less available and higher in cost.

In the course of our experimentation with the polymerization of alpha pinene, turpentine and other mixtures containing predominantly alpha pinene for the purpose of obtaining high yields of resin having melting point above 100° C., we found that a critical part of the operation was the first short period of reaction, roughly about the first 10–35 minutes, during which time a large amount of heat was generated and the maintenance of carefully controlled operating conditions was essential. The products of reaction resulting from this initial polymerization are relatively insensitive to changes in reaction conditions and reaction may be completed by retaining, "soaking," the reaction products in an enlarged vessel for an additional period of about 1–2 hours. Other factors affecting the operation are temperature of reaction, solvent and percent catalyst, as will be hereinafter more fully explained.

A preferred method of carrying out the present invention involves continuously circulating a mixture of alpha pinene, a liquid organic solvent, and a Friedel-Crafts catalyst through a cooling zone adapted to maintain the temperature of the circulating mixture below 20° C., preferably within the range of 0–10° C., withdrawing a portion of the circulating mixture, adding alpha pinene and organic solvent to the circulating mixture in an amount sufficient to maintain the circulating mixture constant, adding a Friedel-Crafts catalyst, preferably aluminum chloride in an amount of about 4–10% by weight of the pinene to the circulating mixture, continuously passing said withdrawn portion of the circulating mixture to a retention zone, maintaining the mixture in said retention zone for a period of time sufficient to substantially complete the polymerization reaction, continuously discharging reaction products from the retention zone, and separating and recovering polymerized terpene resin from the reaction products.

The accompanying drawing is a diagrammatic flow sheet illustrating the present invention. Referring to the drawing, terpene charging stock and solvent are introduced through lines 1 and 2 respectively into feed storage tank 3 desirably equipped with cooling coil 4 to preliminarily cool the feed mix prior to entering the reaction zone. The terpene charging material may be turpentine or fractions thereof which normally contain well over 50% alpha pinene, less than 30% beta pinene and minor amounts of other terpenes. The solvent may be a liquid organic material miscible with turpentine, inert under reaction conditions, desirably an aromatic hydrocarbon and preferably toluene because it is relatively non-toxic, readily available and low in cost. The proportion of solvent to turpentine may be varied within the limits of about 5 parts to 15 parts by weight solvent for every 10 parts by weight turpentine. The use of too low a proportion of solvent to induce the formation of emulsions when scrubbing the reaction product with water and also results in a highly viscous mixture which is most difficult to handle. The use of too dilute a turpentine solution increases the cost of refrigeration and tends to lower the yields. In practice we have found a feed mix consisting of about equal parts by weight of turpentine and toluene gave satisfactory results. The feed mix of turpentine and toluene in tank 3, chilled to approximately 0–5° C. by coil 4, flows at a measured rate through line 5 and valve 6 and is sent by pump 7 through line 8 into the suction line 9 of reactor circulating pump 11.

Recirculating pump 11 forces the feed mix upwardly through line 12 into elevated overflow box 13 from which the feed mix flows through line 14 into the top of shell and tube reactor 15. Powdered anhydrous aluminum chloride is introduced through line 16 at a measured rate to circulating mix stream entering the top of reactor 15 through line 14. Shell and tube reactor 15 is a vertical vessel having tubes incorporated therein around which coolant, for example a mixture of ethyl alcohol and Dry Ice at −10 to −30° C., passes in indirect heat exchange with the terpene-solvent-catalyst flowing down through the tubes thereby effecting rapid efficient dissipation of the exothermic heat of polymerization and avoidance of local hot spots. The temperature of the reactants may be controlled within a few degrees merely by the simple expedient of varying the speed of reactor circulating pump 11 to increase or decrease the flow of circulating medium through reactor 15. The circuit is completed by the liquid discharging from reactor 15 down through line 17 and valve 18 into suction line 9. A substantially constant volume of circulating mixture is maintained in the circuit by means of overflow weir 19 in overflow box 13 through which excess from the reactor system circuit is removed through line 21, discharging into first retention vessel 23. Thus there is maintained a circulating mixture of terpene-solvent-catalyst in a closed circuit at constant uniform conditions with continuous introduction of terpene charging material, solvent and catalyst and continuous withdrawal of a portion of the circulating mixture.

We have found it important to maintain the temperature of the circulating mixture below 20° C., preferably within the range of about 0–10° C., for the reason that at temperatures higher than 20° C. the resultant resin product has a lower melting point. Temperatures substantially lower than 0° C. increase the cost of refrigeration without material advantage in result. We also found it desirable to feed aluminum chloride catalyst into the circulating stream in an amount within the range of about 4–10% by weight of the terpenes charged into the system. Lower amounts of aluminum chloride decrease the yield of resin and the quality of the resin product is inferior, i. e. non-uniform. More than 10% aluminum chloride may be employed but the increase in aluminum chloride is wasteful in that the advantage gained from the excess aluminum chloride does not compensate for the increase in cost of catalyst.

In the past when terpenes were polymerized in the conventional manner by maintaining terpenes in a jacketed kettle under agitation, the catalyst was added in small increments over an extended period of time of 6–12 hours or more and even under these conditions the yield of hard resin was less than 50%, generally of the order of 20–40% when employing alpha pinene or predominantly alpha pinene mixtures. In a circulating system of the present invention we have found surprisingly that yields of over 50% hard resin can be produced in a short period of about 10–35 minutes, i. e. an average residence time of the reactants in the circulating stream of about 10–35 minutes. Further, removal of most of the exothermic heat of reaction is accomplished in the short period of 10–35 minutes and only a minor amount of cooling is required to maintain the reaction mixture withdrawn from the circulating stream at a low temperature during subsequent polymerization for completion of the reaction and enhancement of the yields. Also, in the present continuous process, a consistently uniform high quality resin is produced with facility and ease of operation. Although the residence time of reactants in the circulating system may be extended beyond the 10–35 minute period, as a practical matter the prolongation of the reaction in the circulating body is not desirable because the increased cost of circulating the mixture and reduction in capacity of the more expensive circulating system does not compensate for the smaller increase in yield resulting from prolonging the initial reaction period.

As previously mentioned in the short period of 10–35 minutes, well over 50% of the polymerization reaction occurs in the circulating mixture—indeed, as much as 90% of the reaction may take place therein. However, it is important from a commercial point of view to gain an additional 10–20% resin potentially available in the reaction products withdrawn from the circulating system providing the increase in yield may be accomplished economically. Conversion of the unreacted material to produce this additional 10–20% yield was found to be much more difficult requiring an extended reaction period of 1–3 hours, usually 1½ hours. A further reaction for 1–3 hours to obtain the additional yields of resin could be carried out by circulating the mixture in a closed circuit as described in connection with shell and tube reactor 15. However the cost of carrying out such operation of 1–3 hours would be undesirable in that it involves relatively expensive equipment and high cost of operation which when measured against the small recovery in yield would add appreciably to the cost of the final product. Fortunately, in the initial 10–35 minute reaction period wherein the reactants are circulated in the closed circuit, most of the exothermic heat of reaction is dissipated and we have taken advantage of this fact to accomplish the remainder of the reaction in simple, inexpensive equipment such as an ordinary empty vessel 23 surrounded by a jacket 24 through which coolant is passed. Since only a small amount of exothermic heat is generated in the final stages of the reaction, temperature of the reaction mixture in the vessel may be readily controlled by coolant flowing through surrounding jacket. More specifically the portion of reaction mixture withdrawn from overflow box 13 through line 21 is sent to chamber 23, as for example a "Pfaudler" vessel equipped with the usual stirrer 22 and polymerization of the reaction mixture therein continued. Temperature control of the mixture in chamber 23 is not as critical as in shell and tube reactor 15 and the temperature may be maintained below 20° C. in the "Pfaudler" vessel by coolant entering jacket 24 through line 25 and leaving through line 26. The retention time of the reaction mixture in chamber 23 is approximately ½ hour. Chamber 23 may be operated in a batch manner, but preferably is operated in a continuous manner with continuous withdrawal of reaction mixture from the bottom through line 27 and valve 28. Although only one large vessel may be employed, for convenience the reaction mixture may be passed through two or more similar "Pfaudler" vessels in which latter event the reaction mixture flowing through line 27 enters vessel 29, similar in construction to vessel 23, and equipped with stirrer 31, jacket 32 and coolant inlet and outlet 33 and 34 respectively. When employing two retention vessels 23 and 29 in series as just described the average retention time in each need be only approximately ¾ hour.

The reaction products discharging from retention vessel 29 through line 35 and valve 36 are a mixture of solvent, residual catalyst, terpene resin and a minor amount of unreacted materials originally contained in the turpentine, and an oily material of polymerized terpenes. One of the first steps in separation of the hard polymer resin is the removal of the residual aluminum chloride catalyst from the mixture. This may be accomplished by pumping the reaction mixture by means of pump 37 through line 35 into the bottom of washing column 38 wherein it passes upwardly countercurrent to and in intimate contact with a stream of water introduced through line 39 into the top of column 38. Ordinarily an amount of water equal to or slightly greater than the amount of reaction mixture will be adequate to scrub residual aluminum chloride from the mixture. Waste water is discharged from the bottom of column 38 through line 41 and valve 42. The purified reaction mixture forms an upper layer at the top of column 38 and is withdrawn through line 43 and sent to a conventional stripping operation to remove the more volatile constituents leaving as the desired product a hard resin having a melting point above 100° C. R. & B. The yield of resin based on the terpene charged into the system is in excess of 70%, generally between 75–80%. Merely by way of illustration, a turpentine containing about 65% alpha pinene and 24% beta pinene produces a yield of 78% based on the alpha and beta pinene charged of hard resin having a melting point above 100° C. The advantage of producing high yields in the process of the present invention extends to the washing operation for removal of catalyst in column 38. Because 70–80% or more of the terpenes are converted into a hard resin there is produced only a small amount of oily polymer as compared to the conventional process wherein less than 50% of the terpenes are converted to hard resin and the remainder to oily polymers. These oily polymers cause great difficulty in the operation of scrubbing the reaction products with water to remove aluminum chloride in that the oily polymers induce formation of emulsions which interfere with the separation of resin and not only increase the cost of operation but cause loss in yield. In the process of the present invention wherein the yields of hard resin are of the order of 70–80% or higher, we have found that the reaction mixture can be washed with water to remove residual aluminum chloride catalyst with ease and without difficulty due to emulsion formation.

In order to further illustrate the invention Table 1 under columns I, II, III, IV, V, and VI tabulates examples of operating data when practicing the invention in accordance with the flow sheet to produce hard resin having a melting point, R. & B., above 100° C. in yields greater than 70%. The feed mix to the process is a mixture of toluene and turpentine, the latter containing about 65% alpha pinene and 24% beta pinene.

*Table 1*

|  | I | II | III | IV | V | VI |
|---|---|---|---|---|---|---|
| Ratio of Turpentine to toluene in feed mix | 1:1 | 1:1 | 1:1 | 1:1 | 1:1 | 1:1 |
| Feed Rate, lbs./hr | 186 | 189 | 204 | 360 | 360 | 360 |
| AlCl₃ charged, percent of turpentine | 7.5 | 12.4 | 11.1 | 3.96 | 4.46 | 3.5 |
| Reaction Temperature, ° C., of circulating feed mix | +3 | +9.5 | +12 | +7.8 | +7.5 | +9.8 |
| Average retention time in minutes of circulating feed mix | 32 | 32 | 29 | 16 | 16 | 16 |
| Average retention time in retention zone, hour | 2.3 | 2.0 | 2.7 | 1.5 | 1.5 | 1.5 |
| Reaction Temperature in retention zone, ° C | +5 | +10 | +12 | +8 | +8 | +10 |

The reaction products are washed with water and then stripped under vacuum to remove the toluene solvent, oily polymer and other volatile constituents. The yield of resin and its characteristics are as follows:

*Table 2*

|  | I | II | III | IV | V | VI |
|---|---|---|---|---|---|---|
| Resin yield, percent turpentine | 76 | 74.5 | 79.6 | 71.9 | 76 | 73 |
| Melting point of resin, R. & B., ° C | 106.5 | 110 | 101 | 112 | 104 | 106 |
| Color | O-¾ | O-¾ | O-1 | O-¾ | O-½ | O-½ |
| Ash, percent | None | None | None | 0.02 | 0.01 | None |
| Chloride content, p. p. m. | ------ | 34 | 142 | 42 | 83 | 45 |

Although certain preferred embodiments of the invention have been disclosed for purpose of illustration it will be evident that various changes and modifications may be made therein without departing from the scope and spirit of the invention.

We claim:

1. A method for polymerizing alpha pinene which comprises continuously circulating a mixture of alpha pinene, a liquid organic solvent miscible with the pinene, and a Friedel-Crafts catalyst through a cooling zone adapted to maintain the temperature of the circulating mixture within the range of 0.20° C., maintaining said mixture in the circulating stream for an average residence time of about 10–35 minutes, withdrawing a portion of the circulating mixture, adding alpha pinene, organic solvent and Friedel-Crafts catalyst to the circulating mixture, continuously passing said withdrawn portion of the circulating mixture to a retention zone, maintaining the mixture in said retention zone to effect further polymerization reaction, discharging reaction products from the retention zone, and separating and recovering polymerized alpha pinene from said reaction products.

2. A method for polymerizing a terpene which comprises continuously circulating an organic material containing predominantly alpha pinene, a liquid organic solvent miscible with said material, and a Friedel-Crafts catalyst through a cooling zone adapted to maintain the temperature of the circulating mixture within the range of 0.20° C., maintaining said mixture in the circulating stream for an average residence time of about 10–35 minutes, withdrawing a portion of the circulating mixture, adding the organic material containing predominantly alpha pinene, the organic solvent and Friedel-Crafts catalyst to the circulating mixture, continuously passing said withdrawn portion of the circulating mixture to a retention zone, maintaining the mixture in said retention zone to effect further polymerization reaction, discharging reaction products from the retention zone, and separating and recovering polymer from said reaction products.

3. A method for polymerizing alpha pinene which comprises continuously circulating a mixture of alpha pinene, a liquid organic solvent miscible with the alpha pinene, and aluminum chloride catalyst through a cooling zone adapted to maintain the temperature of the circulating mixture within the range of about 0–10° C., maintaining said mixture in the circulating stream for an average residence time of about 10–35 minutes, withdrawing a portion of the circulating mixture, adding alpha pinene and organic solvent to the circulating mixture, adding aluminum chloride catalyst in an amount of about 4–10% by weight of the alpha pinene to the circulating mixture, continuously passing said withdrawn portion of the circulating mixture to a retention zone, maintaining the mixture in said retention zone at a temperature below 20° C. to effect further polymerization reaction, continuously discharging reaction products from the retention zone, and separating and recovering polymerized alpha pinene from the reaction products.

4. A method for polymerizing turpentine containing predominantly alpha pinene which comprises continuously circulating a mixture of turpentine, a liquid organic solvent miscible with the turpentine, and aluminum chloride catalyst through a cooling zone adapted to maintain the temperature of the circulating mixture within the range of about 0–10° C., maintaining said mixture in the circulating stream for an average residence time of about 10–35 minutes, withdrawing a portion of the circulating mixture, adding turpentine and organic solvent to the circulating mixture, adding aluminum chloride catalyst in an amount of about 4–10% by weight of the turpentine to the circulating mixture, continuously passing said withdrawn portion of the circulating mixture to a retention zone, maintaining the mixture in said retention zone at a temperature below 20° C. to effect further polymerization reaction, continuously discharging reaction products from the retention zone, and separating and recovering polymer from the reaction products.

5. A method for polymerizing turpentine containing predominantly alpha pinene which comprises continuously circulating a mixture of turpentine, toluene and aluminum chloride through a cooling zone adapted to maintain the temperature of the circulating mixture within the range of about 0–10° C., maintaining said mixture in the circulating stream for an average residence time of 10–35 minutes, withdrawing a portion of the circulating mixture, adding turpentine and toluene in the proportion of 5–15 parts by weight of toluene for every 10 parts by weight turpentine to the circulating mixture in an amount sufficient to maintain the circulating mixture substantially constant, adding aluminum chloride catalyst in an amount of about 4–10% by weight of the turpentine to the circulating mixture, continuously passing said withdrawn portion of the circulating mixture to a retention zone, maintaining the mixture in said retention zone at a temperature below 20° C. for a period of 1–3 hours to effect further polymerization reaction, continuously discharging reaction products from the retention zone, washing said discharged reaction products with water to remove residual catalyst, and separating and recovering a resin having a melting point above 100° C. from the washed reaction products.

References Cited in the file of this patent
UNITED STATES PATENTS

| | | |
|---|---|---|
| 2,391,293 | Carmody | Dec. 18, 1945 |
| 2,455,665 | Ford | Dec. 7, 1948 |
| 2,507,105 | Howard et al. | May 9, 1950 |

U. S. DEPARTMENT OF COMMERCE
PATENT OFFICE

CERTIFICATE OF CORRECTION

Patent No. 2,802,813                            August 13, 1957

James B. Maguire et al.

It is hereby certified that error appears in the printed specification of the above numbered patent requiring correction and that the said Letters Patent should read as corrected below.

Column 3, line 4, after "solvent" insert -- tends --; column 4, line 56, for "1/2 hour" read -- 1-2 hours --; column 6, line 22, claim 1, and line 39, claim 2, for "0.20° C.", each occurrence, read -- 0-20° C. --.

Signed and sealed this 8th day of April 1958.

(SEAL)
Attest:

KARL H. AXLINE
Attesting Officer

ROBERT C. WATSON
Commissioner of Patents